(12) United States Patent
Leland et al.

(10) Patent No.: US 11,991,242 B1
(45) Date of Patent: May 21, 2024

(54) EFFICIENT DISTRIBUTED COMPUTING USING EDGE COMPUTING DEVICES

(71) Applicant: Dell Products L.P., Round Rock, TX (US)

(72) Inventors: Jake Mitchell Leland, Round Rock, TX (US); Robert C. Hernandez, Morrisville, NC (US); Uboho Victor, San Antonio, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/065,776

(22) Filed: Dec. 14, 2022

(51) Int. Cl.
*G06F 15/16* (2006.01)
*H04L 67/1008* (2022.01)
*H04L 67/1012* (2022.01)
*H04L 67/1014* (2022.01)

(52) U.S. Cl.
CPC ...... *H04L 67/1012* (2013.01); *H04L 67/1008* (2013.01); *H04L 67/1014* (2013.01)

(58) Field of Classification Search
CPC ............. H04L 67/1012; H04L 67/1008; H04L 67/1014
USPC ........................................................ 709/226
See application file for complete search history.

(56) References Cited

U.S. PATENT DOCUMENTS

| | | | | |
|---|---|---|---|---|
| 7,870,284 | B2 * | 1/2011 | Hunt ...................... | G16H 30/20 382/128 |
| 8,834,253 | B2 * | 9/2014 | Tarantino ............ | G07F 17/3239 463/20 |
| 9,378,622 | B2 * | 6/2016 | Tarantino ............ | G07F 17/3286 |
| 9,619,964 | B2 * | 4/2017 | Tarantino ............ | G07F 17/3211 |
| 10,135,892 | B2 * | 11/2018 | Zimring ................. | A63F 13/26 |
| 10,623,460 | B2 * | 4/2020 | Chang ................ | H04N 21/6377 |
| 10,773,168 | B2 * | 9/2020 | Rodgers ................... | A63F 13/50 |
| 10,827,329 | B1 * | 11/2020 | Dowlatkhah ......... | H04W 8/005 |
| 10,898,812 | B2 * | 1/2021 | Zimring .............. | G06F 9/44568 |
| 11,019,122 | B2 * | 5/2021 | Zimring ................ | A63F 13/428 |
| 11,290,589 | B1 * | 3/2022 | Jolly ....................... | H04W 4/08 |
| 11,303,687 | B2 * | 4/2022 | Chang .............. | H04N 21/41407 |
| 11,305,186 | B2 * | 4/2022 | Champy ............... | A63F 13/335 |

(Continued)

FOREIGN PATENT DOCUMENTS

WO    WO-2020085794 A1 *   4/2020   .............. G06F 3/011

*Primary Examiner* — Alicia Baturay
(74) *Attorney, Agent, or Firm* — Norton Rose Fulbright US LLP

(57) ABSTRACT

Systems and methods described herein may provide a system that enables execution of workloads within a distributed computing environment that includes one or more edge computing devices and/or one or more user computing devices. A computing device may determine a workload for execution within a distributed computing environment that includes a plurality of computing devices. The computing device may determine valid execution slots within the distributed computing environment and may select a first execution slot of the valid execution slots. A first edge computing device may be assigned to execute the workload during the first execution slot. The first execution slot may be selected based on scores computed for the valid execution slots. The scores may be determined based on at least one criteria selected from the group consisting of (i) workload durations, (ii) carbon emissions, (iii) utility costs, and (iv) a disruption penalty.

20 Claims, 10 Drawing Sheets

(56) References Cited

U.S. PATENT DOCUMENTS

| | | | | |
|---|---|---|---|---|
| 11,310,642 | B2* | 4/2022 | Dowlatkhah | H04W 8/20 |
| 11,366,586 | B2* | 6/2022 | Chang | H04L 65/612 |
| 11,369,873 | B2* | 6/2022 | Smullen | G09G 5/397 |
| 11,394,760 | B2* | 7/2022 | Zimring | A63F 13/358 |
| 11,433,311 | B2* | 9/2022 | Zimring | A63F 13/323 |
| 11,632,762 | B2* | 4/2023 | Chakraborty | H04W 64/00 |
| | | | | 370/329 |
| 11,689,497 | B2* | 6/2023 | Shen | G06F 9/547 |
| | | | | 709/226 |
| 11,701,587 | B2* | 7/2023 | Smullen | A63F 13/53 |
| | | | | 463/31 |
| 11,752,426 | B2* | 9/2023 | Todorovic | A63F 13/34 |
| | | | | 463/42 |
| 2003/0135458 | A1* | 7/2003 | Tadano | G06Q 10/02 |
| | | | | 705/40 |
| 2007/0156917 | A1* | 7/2007 | Hunt | G16H 10/40 |
| | | | | 709/232 |
| 2019/0306265 | A1* | 10/2019 | Håkansson | H04L 67/1044 |
| 2023/0267063 | A1* | 8/2023 | Li | G06F 11/3419 |
| | | | | 703/22 |

\* cited by examiner

EFFICIENT DISTRIBUTED COMPUTING USING EDGE COMPUTING DEVICES

FIELD OF THE DISCLOSURE

The instant disclosure relates to information handling systems. More specifically, portions of this disclosure relate to execution of applications and/or workloads by computing devices within a distributed computing environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Information handling systems may be used to execute applications such as gaming applications, cloud computing workloads, and the like. Aspects of embodiments of this disclosure relate to provisioning computing services using edge computing devices, such as edge computing devices in a user's home, to provide computational services within a distributed computing environment. For example, a gaming device located in a user's home may be assigned to execute various workloads received for execution within the distributed computing environment. In certain implementations, computing devices (including edge computing devices) may be scheduled based on valid and available execution slots for the computing devices and the valid execution slots may be scored based on, e.g., workload durations, carbon emissions, utility costs, and/or disruption penalties based on associated computing devices.

In some embodiments, the aspects described herein may be used to support the execution of gaming applications in different environments. Gaming sessions may execute on a service either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously.

According to one embodiment, a method for execution by an information handling system, such as a hub device, includes determining a workload for execution within a distributed computing environment. The distributed computing environment may include a plurality of computing devices. The method may also include determining valid execution slots within the distributed computing environment and determining a first execution slot of the valid execution slots. The first execution slot may be associated with a first edge computing device of the plurality of computing devices. The method may further include assigning the first edge computing device to execute the workload during the first execution slot. The first edge computing device may be a gaming device and valid execution slots for the first edge computing device may be determined as times during which the first edge computing device will not be used to execute gaming applications.

In some aspects, the valid execution slots are times in which corresponding computing devices are available to execute workloads. In some aspects, valid execution slots are identified as execution slots corresponding to computing devices with sufficient computing resources available to execute the workload.

The method may also include determining scores for the valid execution slots based on at least one criteria selected from the group consisting of (i) workload durations to complete the workload during the valid execution slots, (ii) carbon emissions to complete the workload during the valid execution slots, (iii) utility costs to complete the workload during the valid execution slots, and (iv) a disruption penalty for halting execution of the workload. The first execution slot may be selected from among the valid execution slots based on the scores.

In some aspects, the workload durations are computed for the valid execution slots based on at least one of a processing speed and a network speed for corresponding computing devices, and the scores are further determined based on whether the workload durations exceed a target execution time for the workload.

In some aspects, the carbon emissions are computed based on at least one of an estimated energy usage and projected carbon intensity for corresponding computing devices, and the scores are further determined based on whether the carbon emissions exceed an emissions target for the workload.

In some aspects, the utility costs are computed based on at least one of an estimated energy usage and an estimated data transfer costs for corresponding computing devices, and the scores are further determined based on whether the utility costs exceed a target utility cost target for the workload.

In some aspects, the disruption penalty is determined based on at least one of a slot availability confidence and projected slot migrations for the valid execution slots, and the scores are further determined based on whether the disruption penalty exceeds a workload portability target.

In some aspects, the first execution slot includes at least two execution slots associated with at least two edge computing devices, and each of the at least two edge computing devices execute the workload.

In some aspects, determining the workload includes identifying the workload as having a highest priority of a plurality of workloads contained within a work registry.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified, and includes what is specified (e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
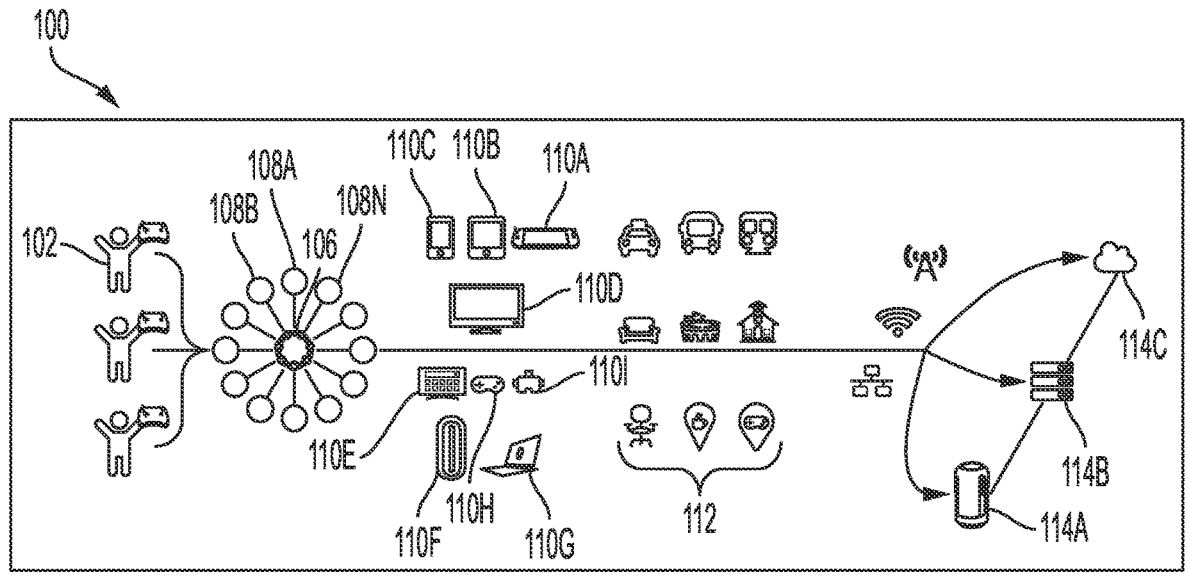
FIG. 1 is a block diagram illustrating aspects of a configurable system for providing services to users according to some embodiments of the disclosure.

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session) and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., hub devices and personal computers).

The user's home may be divided into different environments defined by a space around a host device. For example, a living room with a television may be one environment, and a bedroom with a personal computer may be another environment. A user may use a peripheral device in one of the environments, and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the communication link from the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming, and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game or other application requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application sessions for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen, and/or a video display. The information handling system may also include one or more buses operable to transmit communications between the various hardware components.

FIG. 1 is a block diagram illustrating aspects of a configurable system for providing services to users according to some embodiments of the disclosure. A system 100 includes users 102 who may have access to a shared library of applications 106 including applications 108A-108N. The users 102 may have separate libraries, with some overlapping applications between the libraries. The users 102 may access the library through devices 110A-I, such as mobile gaming device 110A, tablet computing device 110B, phone computing device 110C, television 110D, personal computing device 110E, desktop computing device 110F, laptop computing device 110G, game controller 110H, or VR headset 110I. The devices 110 may access services at any of locations 112, including cars, buses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

Figure 2:
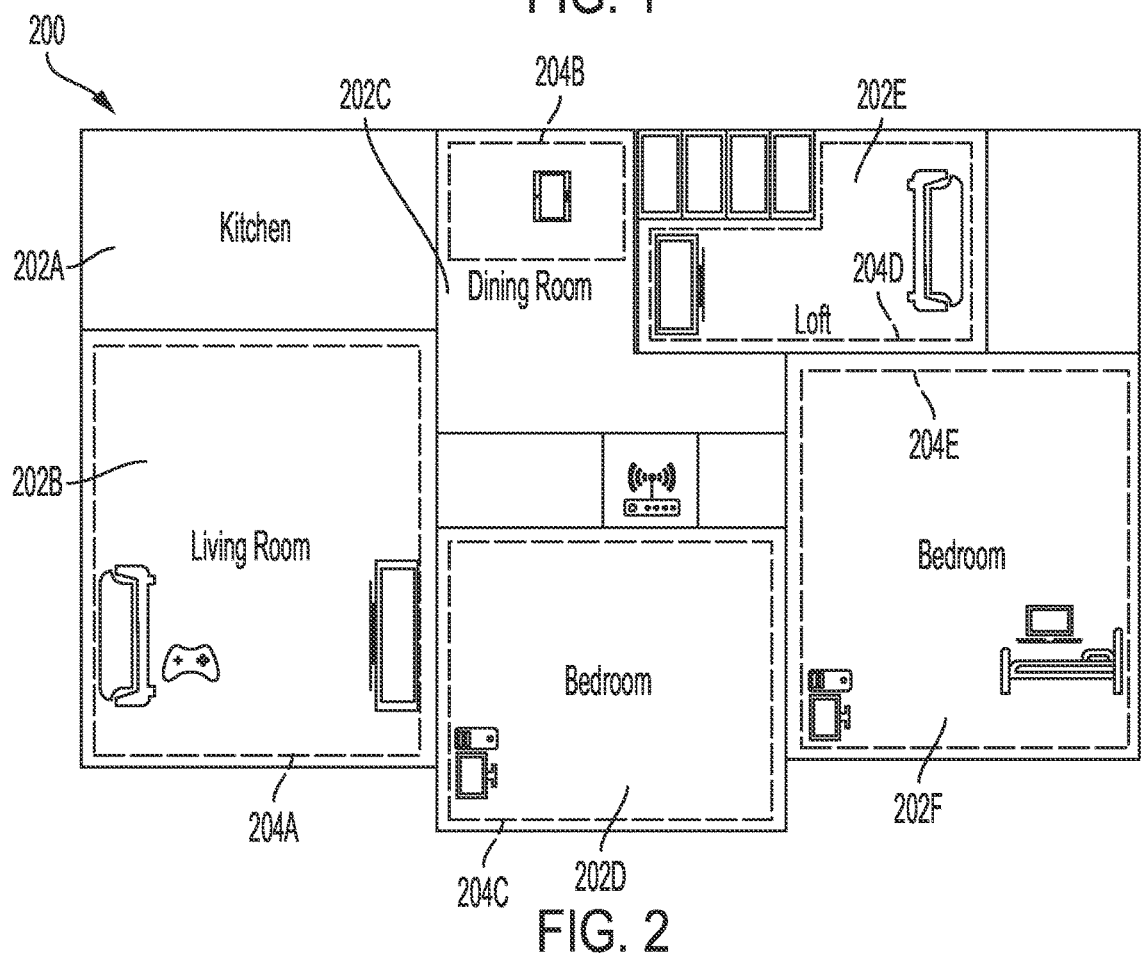
FIG. 2 is a block diagram illustrating possible game environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session. In some embodiments, multiple games may be hosted on a single device. In some embodiments, multiple games may target a single output device. In some embodiments, an application or other computing services manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
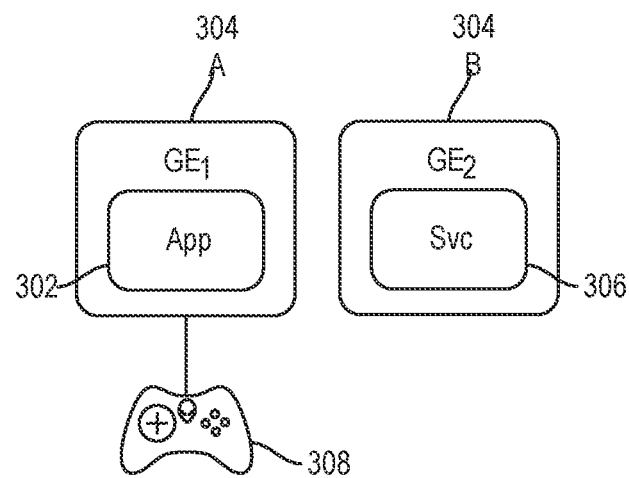
FIG. 3A is a block diagram illustrating application and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
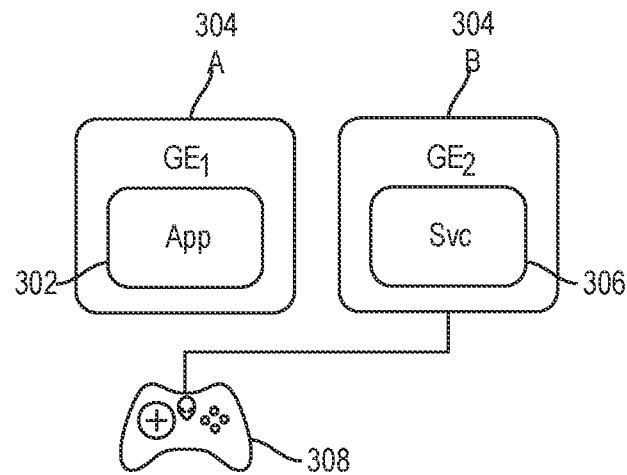
FIG. 3B is a block diagram illustrating application and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
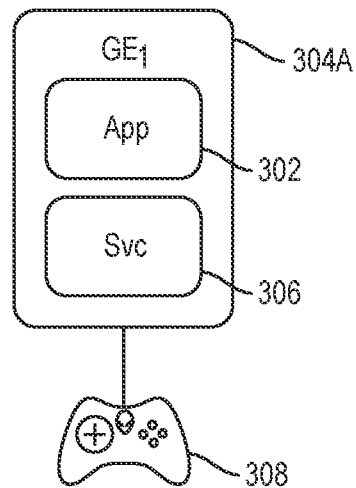
FIG. 3C is a block diagram illustrating application and service hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302.

Figure 3D:
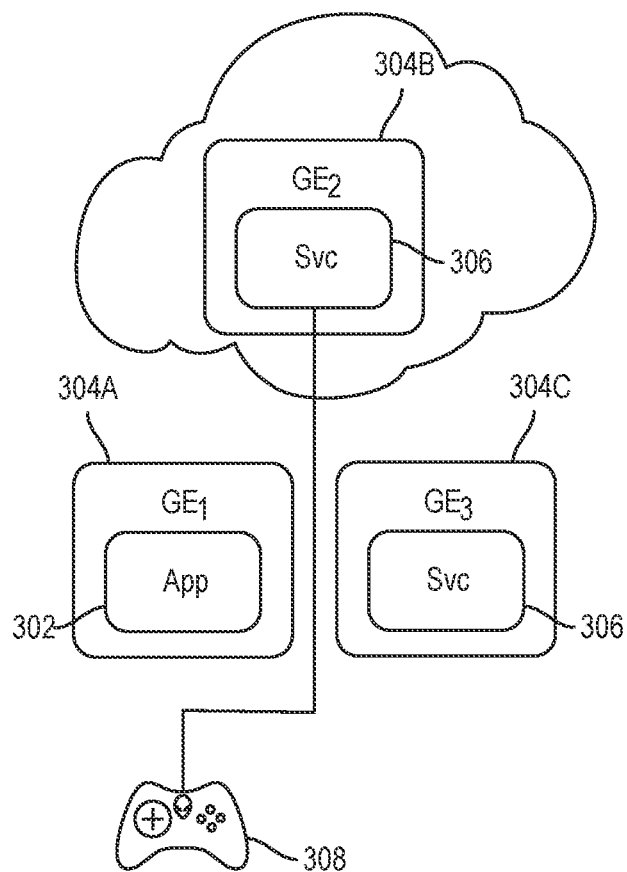
FIG. 3D is a block diagram illustrating a cloud-based service arrangement for a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, such as when the user's home includes the gaming environment 304B but the user is engaging with application 302 at a location on a different network from their home (e.g., at a friend's house). The service 306 may also or alternatively be executed, for example, on a cloud computing device available as a subscription service to the user.

Figure 4:
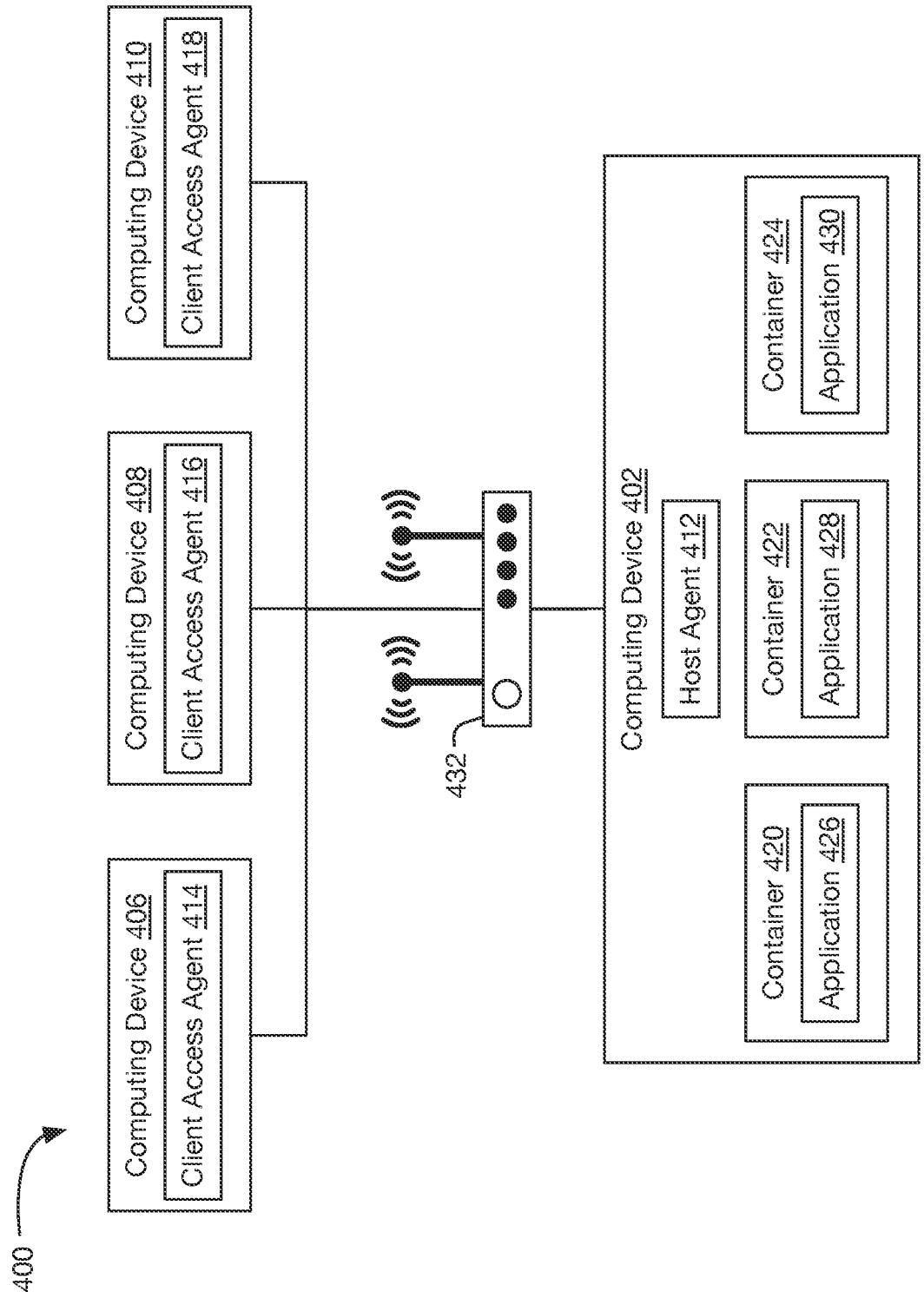
FIG. 4 is a system for provisioning computing services on a local network according to an exemplary embodiment of the present disclosure.

FIG. 4 is a block diagram of a system 400 according to an exemplary embodiment of the present disclosure. The system 400 includes an access point 432 and computing device 402, 406, 408, 410. The system 400 may be configured to provision one or more gaming environments or other computing services to the computing device 406, 408, 410. In particular, the access point 432 may implement a network and the system 400 may be configured to provision various computing services to computing devices 406, 408, 410 connected to the network. The network may be implemented within a particular physical location. For example, the network may be implemented within a physical premises, such as a home, an office, or other facility. In certain instances, the network may be implemented as a local network (e.g., a local area network), a virtual private network, L1, and/or a global network (e.g., the Internet).

The computing devices 402, 404, 406, 408 may be communicatively coupled to the network. For example, the computing devices 402, 404, 406, 408 may communicate with the network using one or more wired network interfaces (e.g., Ethernet interfaces) and/or wireless network interfaces (e.g., Wi-Fi®, Bluetooth®, and/or cellular data interfaces). In certain implementations, the computing device 402 may communicate with the access point 432 using a wired network interface, and one or more of the computing devices 406, 408, 410 may communicate with the access point 432 using a wireless network interface. In certain implementations, the computing device 402 may be collocated with the access point 432 (e.g., may be located within 1-5 feet of the access point 432).

In certain implementations, the computing devices 406, 408, 410 may access, via the access point 432, one or more services provided by the computing device 402. For example, the computing device 402 includes a host agent 412 and containers 420, 422, 424. The containers 420, 422, 424 implement applications 426, 428, 430. The host agent 412 may be configured to provision one or more services to requesting computing devices 406, 408, 410. In particular, requested applications 426, 428, 430 may be implemented within one or more containers 420, 422, 424 executing on the computing device 402. For example, the containers 420, 422, 424 may be provisioned with portions of hardware from the computing device 402 (e.g., CPU/GPU cores, CPU/GPU available time, storage capacity, memory capacity), and the corresponding applications 426, 428, 430 may execute within the containers 420, 422, 424 using the provisioned hardware. In particular, the computing device 402 may receive a request to execute a particular application from one of the computing devices 406, 408, 410, and the host agent 412 may instantiate a corresponding container that implements the requested application.

The applications 426, 428, 430 may include various types of computing processes and computing applications. In certain implementations, the application 426, 428, 430 may include one or more gaming applications, entertainment applications, communication applications, and productivity applications. Gaming applications may include executing video game programs on behalf of the computing devices 406, 408, 410 and may also include other video game-related services, such as video game platforms to purchase, download, and/or update video games. Entertainment applications may include one or more of video streaming applications, video downloading applications, audio streaming applications, audio downloading applications, and the like. Communication applications may include one or more teleconferencing applications, video conferencing applications, e-mail applications, messaging applications, and the like. Productivity applications may include one or more of word processing applications, data processing applications, task management applications, development environments, and the like. One skilled in the art will appreciate that various types of applications 426, 428, 430 may be implemented within containers 420, 422, 424 executing on the computing device 402.

The computing devices 406, 408, 410 include client access agents 414, 416, 418. In certain implementations, interactions between the computing devices 406, 408, 410 and the computing device 402 may occur via the client access agents 414, 416, 418. The client access agents 414, 416, 418 may be programs executing on the computing devices 406, 408, 410 that communicate with the host agent 412 to control execution (e.g., begin execution, stop execution, pause execution, resume execution) of applications 426, 428, 430 by the computing device 402 on behalf of the computing devices 406, 408, 410. The client access agents 414, 416, 418 may also receive data from the computing device 402 (e.g., via host agent 412) during execution of requested applications 426, 428, 430. For example, video data and/or audio data from an application 426, 428, 430 (e.g., a gaming application) may be streamed to a requesting computing device 406, 408, 410 via the client access agents 414, 416, 418. Furthermore, additional commands or inputs may be received from the computing devices 406, 408, 410 during execution of the applications 426, 428, 430. For example, the client access agents 414, 416, 418 may also receive commands from a user and may transmit the commands to the computing device 402 (e.g., video game inputs). In certain implementations, client access agents 414, 416, 418 may also enable user switching of associated devices. In certain implementations, client access agents 414, 416, 418 may enable users to select and resume certain computing sessions on the computing device 402. For example, a user may initiate execution of the application 426 via the computing device 406 and may switch to the computing device 408 (e.g., when transitioning between gaming environments). In such instances, the client access agents 414, 416, 418 may communicate with the host agent 412 to pause execution of the application 426 (e.g., via the client access agent 414) and to resume execution of the application 426 (e.g., via client access agent 416) once the user has switched computing devices.

In certain implementations, the computing device 402 may implement various applications 426, 428, 430 without being requested to by one of the computing devices 406, 408, 410. For example, the host agent 412 may be configured to provide one or more of user management services, container management services, application updating services, subscription management services, guest management services, and/or user presence detection services. Similarly, the computing device 402 may be configured to implement one or more platform integration services, social presence and communication services, video game library aggregation services, video game launching services, streaming management services, content installation management and update management services, settings management services, account management services, and/or telemetry/statistics collection and analytics services. In certain implementations, the computing device 402 may perform one or more networking services for the access point 432. For example, the computing device 402 may execute one or more networking services to improve the quality of networking services provided to the computing devices 406, 408, 410 by the access point 432. In certain implementations, the computing device 402 may execute one or more voice command services to receive and process voice commands from one or more users (e.g., from one of the computing devices 406, 408, 410). For example, voice commands may be received to control execution of applications 426, 428, 430 (e.g., to begin, pause, and resume execution of gaming applications).

In certain implementations, the computing device 402 may additionally execute applications 426, 428, 430 that are not on behalf of other computing devices 406, 408, 410 (e.g., within containers and/or separate from containers). For example, the computing device 402 may be coupled to a display and may be configured to present results of the applications 426, 428, 430 via the display. In one particular implementation, the computing device 402 may be used as a local gaming device, executing gaming applications for presentation via the display. In certain implementations, the computing device 402 may be configured to simultaneously serve as a local gaming device and to execute applications 426, 428, 430 on behalf of other computing devices 406, 408, 410.

The computing devices 402, 404, 406, 408 may also include processors and memories (not depicted). The processors and memories may implement one or more aspects of the computing devices 402, 404, 406, 408. For example, the memories may store instructions which, when executed by the processors, may cause the processors to perform one or more operational features of the computing devices 402, 404, 406, 408. The processors may be implemented as one or more central processing units (CPUs), field programmable gate arrays (FPGAs), and/or graphics processing units (GPUs) configured to execute instructions stored on the memory.

Figure 5:
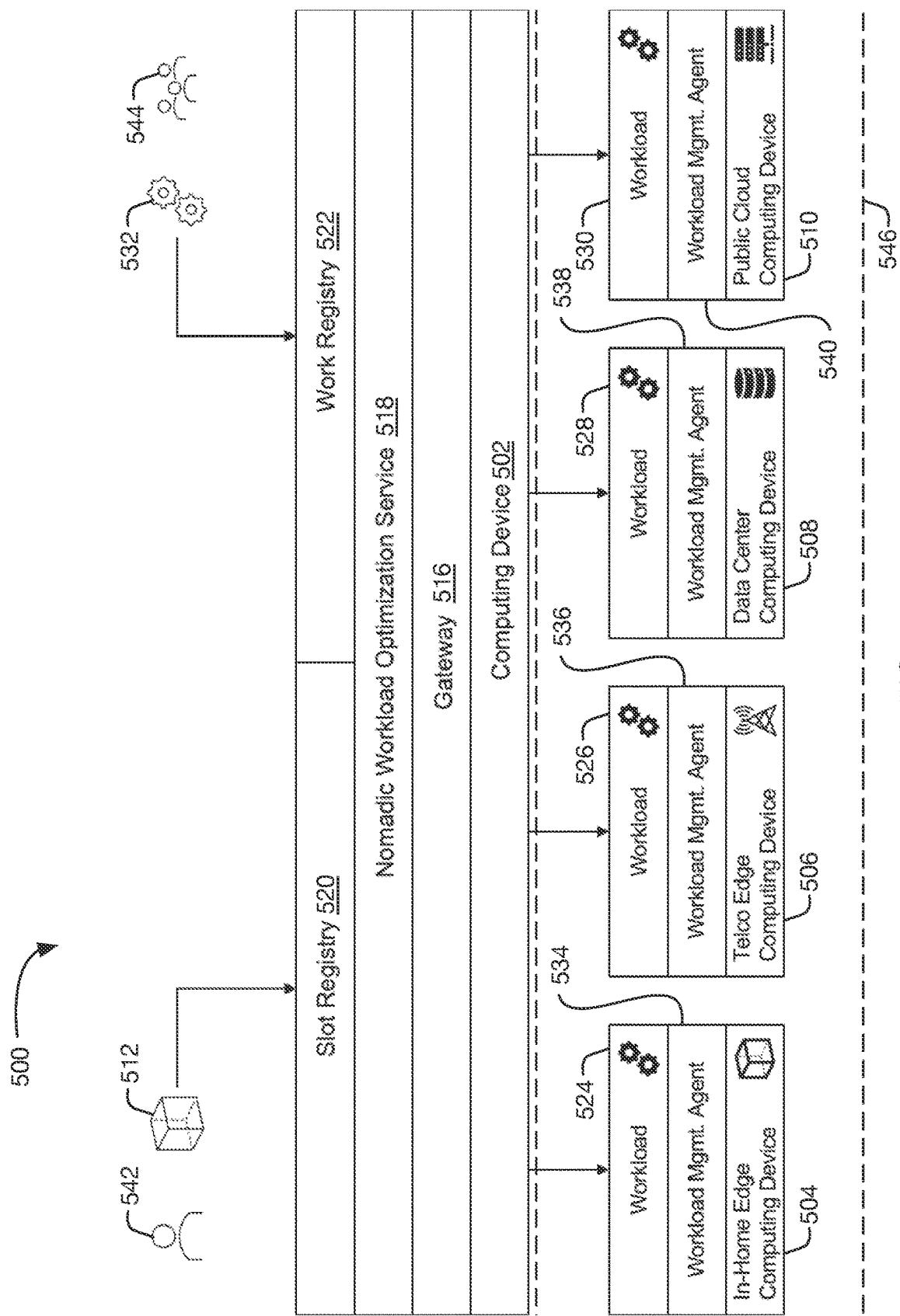
FIG. 5 depicts a system 500 according to an exemplary embodiment of the present disclosure.

FIG. 5 depicts a system 500 according to an exemplary embodiment of the present disclosure. The system 500 includes a computing device 502 and a distributed computing environment 546. The computing device 502 may be configured to coordinate execution of workloads within the distributed computing environment 546. The distributed computing environment 546 includes computing devices 504, 506, 508, 510. In particular, the distributed computing environment 546 may include different types of computing devices. For example, the computing devices 508, 510 may be centralized computing devices executing within dedicated computing facilities (e.g., data center facilities, cloud computing facilities, and the like). In particular, the computing device 508 may be a data center computing device and the computing device 510 may be a public cloud computing device. Other computing devices, such as the computing devices 504, 506 may be edge computing devices. Edge computing devices may be located outside of dedicated computing facilities and/or may be located near requesting computing devices. For example, the computing device 506 may be a telecommunication edge computing device, which may be located within a telecommunications or other networking facility that directly provisions telecommunication services to customers. As another example, the computing device 504 may be an in-home edge computing device, which may be implemented as a computing device (e.g., a personal computing device, a gaming device, a hub device such as an in-home gaming/productivity server) located within a user's home, office, or other personal location. In certain implementations, the computing devices 506, 508, 510 may be implemented as server devices.

The computing devices 504, 506, 508, 510 include workload management agents 534, 536, 538, 540 and workloads 524, 526, 528, 530. The workload management agents 534, 536, 538, 540 may coordinate the execution of one or more workloads 524, 526, 528, 530 by the computing devices 504, 506, 508, 510. The workloads 524, 526, 528, 530 may represent one or more computing processes requested for execution within the distributed computing environment 546. For example, workload 532 may be received from a user 544 (e.g., an individual user, an organization) to be executed by the distributed computing environment 546. In certain implementations, the computing devices 504, 506, 508, 510 may be configured to execute one workload 524, 526, 528, 530 at a time. In additional or alternative implementations, the computing devices 504, 506, 508, 510 may execute more than one workload 524, 526, 528, 530 at the same time. In certain implementations, the workloads 524, 526, 528, 530 may execute directly on the computing hardware within the computing devices 504, 506, 508, 510 (e.g., bare metal execution). In additional or alternative implementations, the workloads 524, 526, 528, 530 may execute within containers, virtual machines, or other compartmentalized computing systems.

The computing device 502 includes a gateway 516, which includes a workload optimization service 518. The gateway 516 may be responsible for network communication and other services. For example, the computing device 502 may be an orchestrator or other computing device for the distributed computing environment 546, and the gateway 516 may coordinate communication with the computing devices 504, 506, 508, 510. In particular, the workload optimization service 518 may be responsible for coordinating which workloads 524, 526, 528, 530 are performed by which computing devices 504, 506, 508, 510 and when the workloads 524, 526, 528, 530 are performed. To do so, the workload optimization service 518 includes a slot registry 520 and a work registry 522. For example, the workload optimization service 518 may store or otherwise maintain the slot registry 520 and the work registry 522. The slot registry 520 may store information regarding computing devices 504, 506, 508, 510 within the distributed computing environment 546. For example, the slot registry 520 may store information regarding available computing resources (e.g., CPU cores, GPU cores, ram capacity, storage capacity, storage speed, ram speed) for the computing devices 504, 506, 508, 510, available times/availability confidence measures for executing workloads for the computing devices 504, 506, 508, 510, hardware or software compatibility information for the computing devices 504, 506, 508, 510, locations (e.g., network locations, physical locations) for the computing devices 504, 506, 508, 510, projected carbon intensity for energy utilized by the computing devices 504, 506, 508, 510, projected energy or utility costs for the computing devices 504, 506, 508, 510, network characteristics (e.g., network speed, network latency, network stability) for the computing devices 504, 506, 508, workload cancellation likelihoods for the computing devices 504, 506, 508, execution slot availability for the computing devices 504, 506, projected execution slot migrations for the computing devices 504, 506, and the like. The work registry 522 may store information regarding workloads available for execution by the distributed computing environment 546. For example, the work registry 522 may store information regarding required computing resources for available workloads, required network resources for available workloads, portability (e.g., how frequently a workload can be interrupted and/or transferred during execution) for available workloads, target execution times for the workloads, target execution durations for the available workloads, target carbon emissions for the available workloads, target utility costs for the available workloads, and the like.

The workload optimization service 518 may be configured to enroll new computing devices within the distributed computing environment 546. Enrolled devices may then be available to perform or execute requested workloads. For example, the workload optimization service 518 may receive a request from a user 542 to enroll their computing device 512 within the distributed computing environment. The workload optimization service 518 may receive information regarding the computing device 512, such as one or more of the items of information described above in connection with the slot registry 520. After receiving this information, the workload optimization service 518 may establish a communication link with the computing device 512 and may utilize the computing device 512 for future workload requests (e.g., by assigning workloads to the computing device 512 for execution). In certain implementations, enrolling the computing device 512 may include installing the workload management agent 534, 536, 538, 540 on the computing device 512 to enable communication and coordination with the workload optimization service 518. The computing device 512 may be an edge device, such as an in-home edge computing device, similar to the computing device 504. For example, the computing device 512 may be an exemplary implementation of the computing device 402 in the system 400.

The workload optimization service 518 may be configured to receive new workload requests from user 544. For example, the workload optimization service 518 may receive a request from a user 544 to perform a workload 532. The workload optimization service 518 may receive information regarding the workload 532, such as one or more of the items of information described above in connection with the work registry 522. After receiving this information, the workload optimization service 518 may add the workload 532 to the work registry 522. For example, the workload optimization service 518 may store a copy of the workload 532 (e.g., a copy of the program to be executed, can identifier of the program to be executed) and any corresponding information received from the user 544. The workload 532 may then be eligible for execution by computing devices 504, 506, 508, 510 within the distributed computing environment 546.

To assign workloads 524, 526, 528, 530 to the computing devices 504, 506, 508, 510 for execution, the computing device 502 may be configured to determine a workload for execution. For example, the workload optimization service 518 may identify a workload for execution from the work registry 522. The workload selected may be the highest priority workload within the work registry 522. For example, the workload optimization service 518 may maintain priority rankings for workloads within the work registry 522. The priorities may be determined based, e.g., on target execution times and/or a number of times execution of the workload has been deferred or migrated. In particular, workloads with earlier execution times may be ranked with a higher priority and workloads with a larger number of deferrals may be ranked with a higher priority. The workload optimization service 518 may then retrieve information regarding the selected workload (e.g., workload 532 from the work registry 522).

The computing device 502 may be configured to determine valid execution slots within the plurality of edge computing devices 504, 506, 508, 510. In certain implementations, execution slots are times in which corresponding computing devices 504, 506, 508, 510 within the distributed computing environment 548 are available to execute workloads 524, 526, 528, 530. In certain implementations, valid execution slots are identified as execution slots for available computing devices 504, 506, 508, 510 that meet one or more requirements for the workload 532 (e.g., computing resource requirements, networking requirements, availability requirements). In particular implementations, the valid execution slots may be identified as corresponding to edge devices with sufficient computing resources available to execute the workload 532 (e.g., as indicated by a computing resource requirement for the workload 532).

In certain implementations, the execution slots are identified based on downtime for the computing devices 504, 506, 508, 510 in which the computing devices 504, 506, 508, 510 are available for executing workloads. In particular, where the computing devices 504, 506 are edge computing devices, the execution slots may be identified as times in which the computing devices 504, 506 are typically not in use for other services (e.g., personal computing services, gaming services, networking services). As one example, the computing device 504 may be a personal computing device (e.g., an exemplary implementation of the computing device 402) and may typically be used to play video games from 5-10 PM on weekdays. In such instances, time slots that do not fall between 5-10 PM on weekdays may be identified as candidate execution slots for the computing device 504. As another example, the computing device 504 may be a personal computing device typically used for professional 3D modeling from 8 AM-6 PM on weekdays. In such instances, time slots that do not fall between 8 AM-6 PM on weekdays may be identified as candidate execution slots for the computing device 504. As another example, the computing device 506 may be an edge computing device located within a telecommunications networking center. In such instances, the edge computing device 506 may be used to perform networking or content serving applications during peak usage periods (e.g., 9 AM-10 PM), and execution slots for the distributed computing environment 546 may be identified as times that fall outside the peak usage periods. In certain implementations, the computing device 502 and/or the edge computing devices 504, 506 may monitor usage patterns for the computing devices 504, 506 and may identify time periods in which the computing devices 504, 506 are typically available to execute workloads. In additional or alternative implementations, users may indicate times in which the computing devices 504, 506 are available to execute workloads (e.g., when enrolling the computing devices 504, 506 within the distributed computing environment 546).

The computing device 502 may be configured to determine scores for the valid execution slots based on at least one of (i) workload durations to complete the workload during the valid execution slots, (ii) carbon emissions to complete the workload during the valid execution slots, (iii) utility costs to complete the workload during the valid execution slots, and (iv) a disruption penalty for halting execution of the workload. These calculations are explained in greater detail below in connection with the operation 800 and FIG. 8.

The computing device 502 may be configured to determine an execution slot of the valid execution slots based on the scores. For example, the workload optimization service 518 may select an execution slot from among the valid execution slots in which the selected workload 532 will be executed. This selection may be made based on the scores. For example, the workload optimization service 518 may select the slot with the highest corresponding score. In additional or alternative implementations, the workload optimization service 518 may select the slot with the lowest available score (e.g., while still meeting all requirements specified for the workload 532). The selected execution slot may correspond to an edge computing device 504, such as a user computing device (e.g., a gaming device located within a user's home). In certain implementations, more than one execution slot may be selected. For example, certain workloads may be executable in parallel. In such instances, the workload optimization service 518 may select two or more execution slots to perform the workload 532. In certain implementations, the slots may execute in parallel. In additional or alternative implementations, the slots may execute at different times.

The computing device 502 may be configured to assign a computing device to execute the workload 532 during the selected execution slot. In particular, the workload optimization service 518 may assign the computing device 504 to execute the workload 532 during the selected execution slot. When the time for the selected execution slot arrives, the computing device 504 may begin executing the workload 532. In certain instances, execution of the workload 532 may be interrupted. For example, a user may begin playing video games on the computing device 504 before execution of the workload 532 has been completed. Accordingly, it may be necessary to migrate the workload 532 to a different computing device. In such instances, the workload 532 may be added back to the work registry 522 for migration. In certain instances, a priority of the workload 532 may be increased to indicate that the workload is being migrated and to increase the likelihood that execution of the workload 532 is completed on time.

In certain instances, none of the valid execution slots may correspond to computing devices that meet the requirements for the selected workload 532. In such instances, execution of the workload 532 may be deferred. To defer execution, the workload optimization service 518 may add or update to the workload 532 within the registry 522. In particular, a priority of the workload 532 may be increased and stored within the work registry 522. Additionally or alternatively, a deferral time may be added to the workload 532, indicating that the workload 532 should not be selected for execution scheduling for a predetermined period of time (e.g., 1 minutes, 5 minutes, 10 minutes, half an hour, one hour, two hours, 10 hours). In various implementations, after a certain number of deferrals for a given workload, the workload optimization service 518 may escalate the workload 532 (e.g., to a different distributed computing environment 546, to a user to request additional input).

Figure 6:
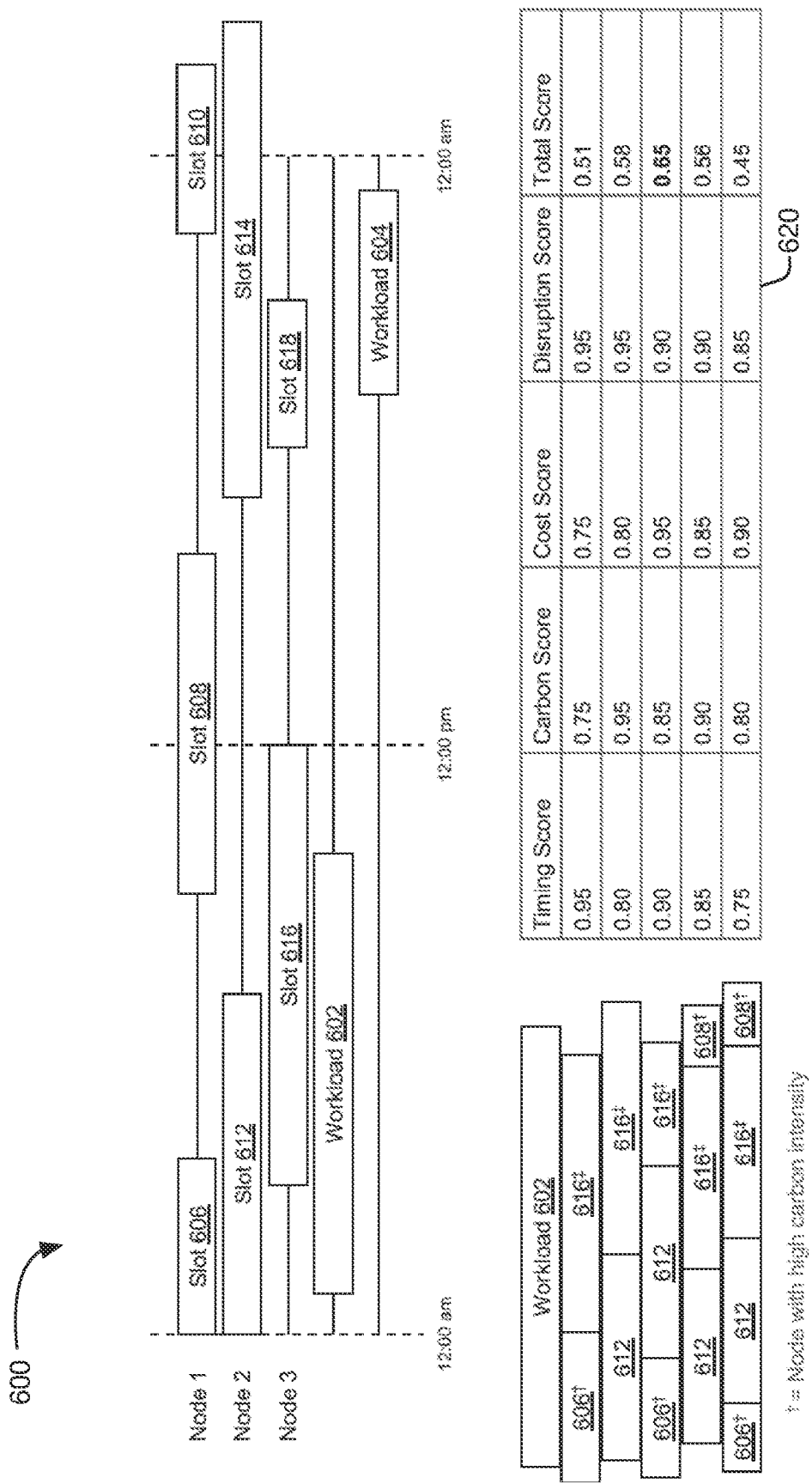
FIGS. 6 and 7 depict execution slot scoring operations 600, 700 according to exemplary embodiments of the present disclosure.
Figure 7:
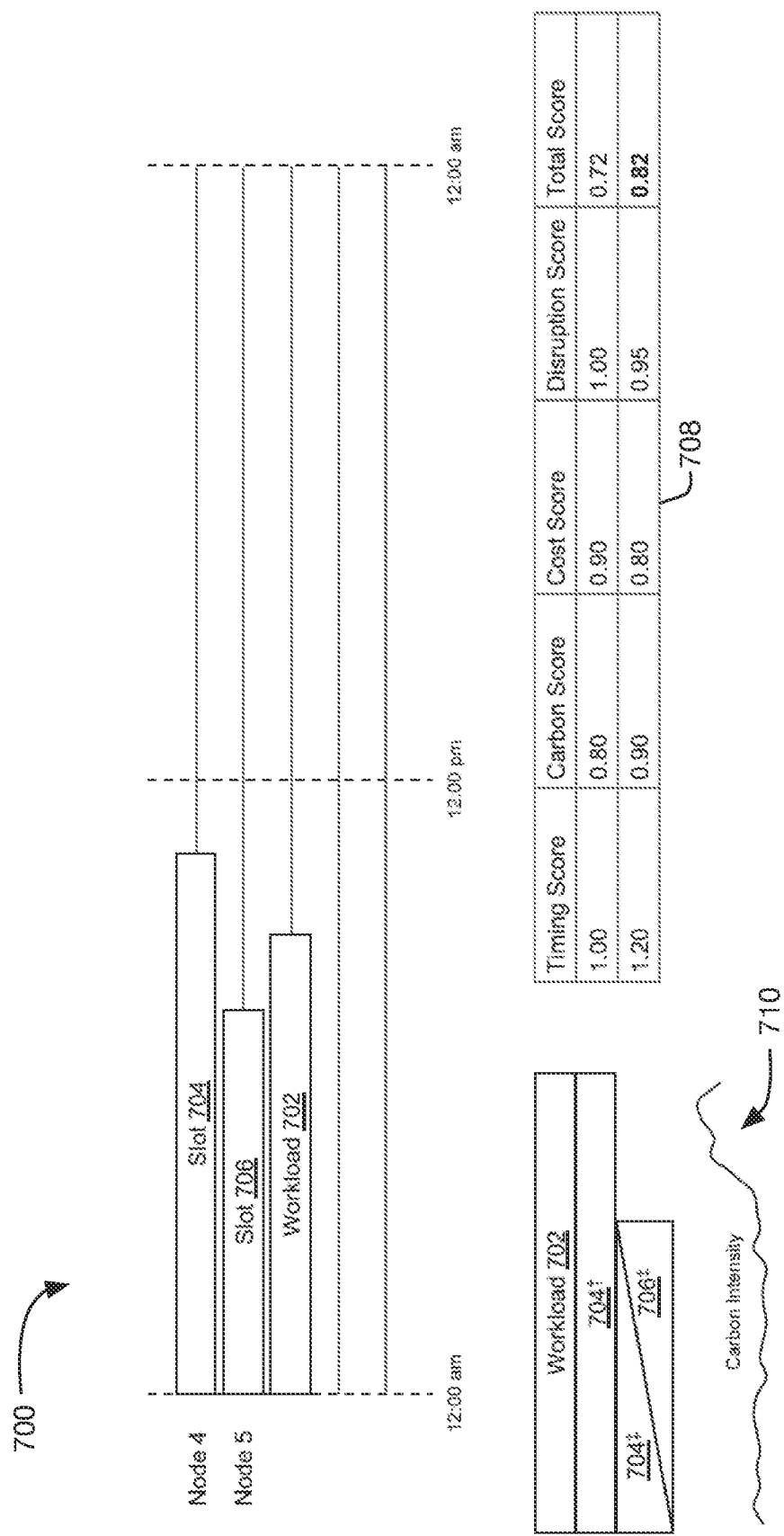

FIGS. 6 and 7 depict execution slot scoring operations 600, 700 according to exemplary embodiments of the present disclosure. The operation 600 depicts execution slot scoring for a workload 602 that cannot be executed in parallel. The operation 700 depicts execution slot scoring for a workload 702 that can be executed in parallel. In certain implementations, the operations 600, 700 may be exemplary implementations of processing performed by the workload optimization service 518.

Beginning with the operation 600, a distributed computing environment includes 3 nodes 1-3. Node 1 has 3 available execution slots 606, 608, 610. The node 2 includes 2 available execution slots 612, 614. The node 3 includes 2 available execution slots 616, 618. The node 1 may have a high carbon intensity. For example, the node 1 may be powered using energy resources that have comparatively high carbon emissions. Node 2 may have high energy costs. For example, the node 2 may be powered using energy that is comparatively more expensive. To assign execution of the workload 602, the slots 606, 608, 612, 616 may be identified as valid execution slots. The remaining slots 610, 614, 618 occur after an expected completion time for the workload 602 (e.g., 10 AM) and may accordingly be excluded as valid execution slots.

Different combinations of the valid execution slots 606, 608, 612, 616 may then be scored to determine which combination of slots should be assigned. For example, the workload optimization service 518 may determine that more than one slot is necessary for the nodes 1-3 to complete execution of the workload 602 (e.g., based on an estimated time of completion for the workload 532). Accordingly, the workload optimization service 518 may identify and score different combinations of slots. In practice, it should be noted that similar techniques to those discussed herein may be used to determine scores for individual slots. In the depicted example, the workload optimization service 518 has identified five combinations of slots: a first combination of slots 606, 616; a second combination of slots 612, 616; a third combination of slots 606, 612, 616; a fourth combination of slots 612, 616, 618; and a fifth combination of slots 606, 612, 616, 608.

The workload optimization service 518 may then compute one or more scores for the combinations of slots. These scores 620 may include a timing score, a carbon score, a cost score, and a disruption score. The timing score may be computed based on how quickly and/or how early execution of the workload 602 may be completed (e.g., with higher values indicating in earlier completion time and/or a shorter execution duration). The timing score may also be computed based on whether a start time for a selected slot is near a desired start time for the workload 602 (e.g., with higher values indicating start times that are closer to the desired start time). The carbon score may be computed based on estimated carbon emissions caused by execution of the workload 602 by assigned nodes 1-3 (e.g., with higher values indicating less carbon omitted). The cost score may be computed based on an estimated utility cost for executing the workload 602 by assigned nodes 1-3 (e.g., with higher values indicating lower costs). The disruption score may be computed based on an estimated likelihood of disruption (e.g., migration or deferral) for execution of the workload for assigned nodes 1-3 (e.g., with higher scores indicating lower likelihood of disruption). These scores may then be combined to generate a total score for the combinations. For example, the scores may be averaged or combined as a weighted combination to generate the total score. As another example, the scores may be multiplied together to generate the total score. As a further example, these scores may be compared to one or more score thresholds to generate the total score (e.g., where exceeding the threshold increases the total score and falling below the threshold decreases the total score). One skilled in the art may appreciate there are many techniques (e.g., statistical techniques) that may be used to combine the scores to generate the total score. As explained further above, the workload optimization service 518 may select the combination with the highest total score (e.g., third combination of slots 606, 612, 616) and may assign the computing devices (e.g., nodes 1-3) to execute the workload 602 during the corresponding execution slots 606, 612, 616.

Similar to the operation 700, the operation 600 includes a plurality of nodes 4-5 and a workload 702 for execution by the nodes 4-5. The node 4 has 1 available slot 704 and the node 5 has 1 available slot 706. The workload 702 may be parallelizable, meaning that the workload 702 may be executable by more than one computing device at the same time. Accordingly, multiple computing devices (and thus multiple execution slots) may be assigned for execution of the workload 702 at the same time. The workload optimization service 518 may accordingly identify several combinations of slots, including a first combination of only the slot 704 and a second combination of these slots 704, 706 in parallel. The workload optimization service 518 may similarly compute scores 708 (e.g., timing scores, carbon scores, cost scores, disruption scores) for the combinations of slots. In particular, the carbon score may be computed based on a predicted increase in carbon intensity 710 for a later time period (e.g., after 8 AM). Accordingly, the carbon score for the first combination may be lower than the carbon score for the second combination, indicating higher levels of carbon emissions (e.g., because the first combination takes longer to complete execution of the workload 702 and thus includes execution of the workload 702 during the period of higher carbon intensity). Based on the combined total scores, the workload optimization service 518 may select the second combination of slots 704, 706 to execute the workload 702 and may assign the nodes 4-5 to both execute the workload 702 at the same time during the slots 704, 706.

Figure 8:
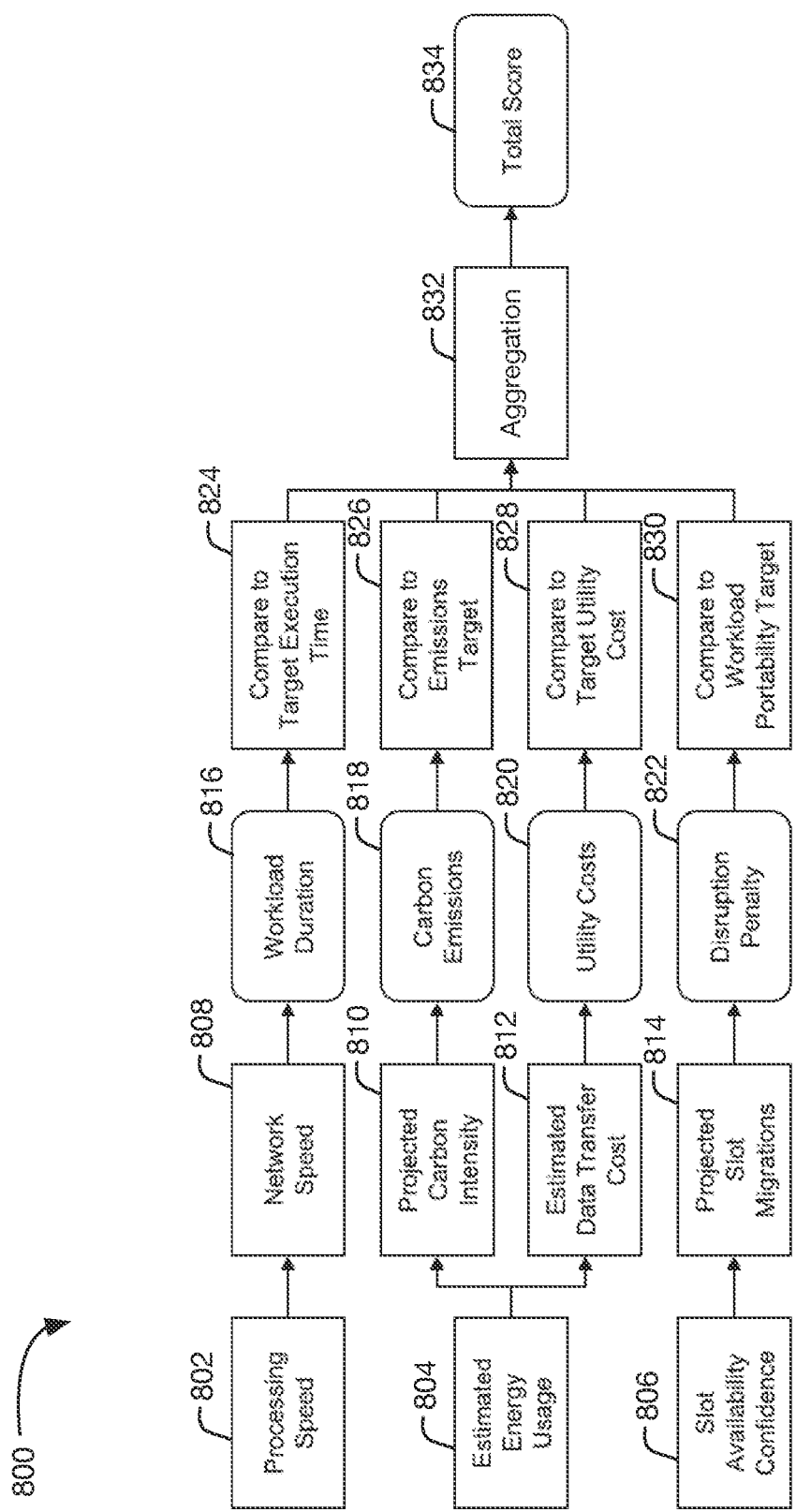
FIG. 8 Depicts an operation to compute a total score for one or more execution slots according to an exemplary embodiment of the present disclosure.

FIG. 8 depicts an operation 800 to compute a total score 834 for one or more execution slots according to exemplary embodiments of the present disclosure. The operation 800 may be an exemplary operation performed by the workload optimization service 518. For example, the operation 800 may be performed to compute the scores 620, 708 in the operations 600, 700.

The workload optimization service 518 may be configured to determine total score 834 based on at least one of (i) workload durations 816, (ii) carbon emissions 818, (iii) utility costs 820, and (iv) a disruption penalty 822 for a selected workflow.

The workload durations 816 may be computed as an estimated time to finish executing the workload during the valid execution slots. In certain implementations, the workload durations 816 are computed for the valid execution slots based on at least one of a processing speed 802 and a network speed 808 for corresponding computing devices 504, 506, 508, 510. In certain implementations, the total score may be determined based on whether the workload durations 816 exceed a target execution time for the workload. For example, the workload optimization service 518 may compare the workload durations to the target execution time (block 824) and may reduce the total score or reduce a corresponding duration score if the workload duration 816 exceeds the target execution time. The target execution time may include a target time of completion and/or a total desired execution time for the workload. In certain instances, execution slots whose workload duration exceeds the target execution time may be disqualified (e.g., may be removed as valid execution devices, may receive a score of 0). In certain implementations, an estimated time to complete execution of the workload may exceed a duration of the valid execution slot. In such instances, the workload optimization service 518 may be configured to identify and determine scores for combinations of multiple valid execution slots (e.g., as in the operations 600, 700).

The carbon emissions 818 may be computed as an estimated amount of carbon emitted as a result of completing the workload during the execution slots. In certain implementations, the carbon emissions 818 are computed based on at least one of an estimated energy usage 804 and a projected carbon intensity 810 for corresponding edge computing devices 504, 506, 508, 510. The estimated energy usage 804 may be received with the workload (e.g., with a request from the user). Additionally or alternatively, the estimated energy usage 804 may be estimated (e.g., based on a complexity of the workload, based on previous executions of the workload, based on previous executions of similar workloads). The projected carbon intensity 810 may be determined based on locations for the corresponding computing devices 504, 506, 508, 510 (e.g., based on a typical energy mix for corresponding location). Additionally or alternatively, the projected carbon intensity may be based information provided during enrollment (e.g., an energy mix indicated by an enrolling user). In certain implementations, the total scores 834 may be determined based on whether the carbon emissions 818 exceed an emissions target for the workload. The emissions target may include maximum total emissions allowed while completing the workload. For example, the workload optimization service 518 may compare the carbon emissions 818 to the emissions target (block 826) and may reduce the total score or reduce a corresponding carbon score if the carbon emissions 818 exceed the emissions target. In certain instances, execution slots whose carbon emissions 818 exceed the emissions target may be disqualified (e.g., may be removed as valid execution slots, may receive a score of 0).

The utility costs 820 may be computed to indicate a total utility cost to complete the workload during the execution slots. In certain implementations, the utility costs 820 are computed based on at least one of an estimated energy usage 804 and estimated data transfer costs 812 for corresponding computing devices 504, 506, 508, 510. In certain implementations, the estimated data transfer costs 812 may be determined based on an estimated data usage for the workload, which may be received during enrollment of the workload or estimated based on the workload or similar workloads. Utility costs 820 may further depend on energy cost information for the corresponding edge computing devices 504, 506, 508, 510. For example, utility costs 820 may be determined based on locations for the corresponding edge computing devices 504, 506, 508, 510 (e.g., typical energy costs for corresponding location) and/or may be determined based on information provided during enrollment (e.g., energy costs indicated by an enrolling user). In certain implementations, the scores are further determined based on whether the utility costs 820 exceed a target utility cost target for the workload. For example, the workload optimization service 518 may compare the utility costs 820 to the target utility cost (block 828) and may reduce the total score or reduce a corresponding cost score if the utility costs 820 exceed the target utility cost. In certain instances, execution slots whose utility costs 820 exceed the target utility cost may be disqualified (e.g., may be removed as valid execution slots, may receive a score of 0). In certain implementations, the target utility cost may include a maximum total utility cost incurred during execution of the workload.

The disruption penalty 822 may be computed based on how likely it is for execution of the workload to be halted after the workload has been assigned (e.g., to be migrated, deferred). The disruption penalty 822 may be determined based on at least one of a slot availability confidence 806 and projected slot migrations 814 for the valid execution slots. In certain implementations, the slot availability confidence 806 may indicate a predicted likelihood that a corresponding execution slot will remain available for the entire expected duration to complete execution of the workload (e.g., the workload duration 816). In certain implementations, the slot availability confidence 806 may depend on the type of corresponding computing device 504, 506, 508, 510. For example, slot availability confidence 806 may be higher for non-edge devices 508, 510 than for edge devices 504, 506, may be higher for telecom edge devices 506 than for in-home edge devices 504, and/or may be higher for server computing devices 506, 508, 510 than for user computing devices 504. In certain implementations, the slot availability confidences 806 may be computed for different types of devices based on previous workload executions by the computing devices 504, 506, 508, 510 (or similar computing devices). For example, the slot availability confidences 806 for a particular computing device 504 may be computed based on how frequently workloads were migrated previously when assigned to the computing device 504. The projected slot migrations 814 may be similarly computed to indicate a predicted number of migrations for the workload if the workload is assigned to a particular execution slot or combination of execution slots. In certain implementations, the scores are further determined based on whether the disruption penalty 822 exceeds a workload portability target. For example, the workload optimization service 518 may compare the disruption penalty 822 to the workload portability target (block 830) and may reduce the total score or reduce a corresponding cost score if the disruption penalty 822 exceeds the workload portability target. In certain instances, execution slots whose disruption penalty 822 exceeds the workflow portability target may be disqualified (e.g., may be removed as valid execution slots, may receive a score of 0). In certain implementations, the workload portability target may be received from users and/or may be determined based on other received information. For example, workloads with more data may have a lower workload portability target because of the added financial costs and delay required to transfer the data. Similarly, workloads with higher startup latencies may have lower workload portability targets because of the additional delays needed to restart execution of the workload after migration.

The total score 834 may then be computed based on the comparisons at blocks 824, 826, 828, 830. In particular, a workload score, carbon score, cost score, and/or disruption score computed based on the comparisons at blocks 824, 826, 828, 830 may be aggregated (block 832). In certain implementations, the aggregation may be performed as a weighted combination of the carbon score, the workload score, the cost score, and/or the disruption score. For example, different weights for different priorities may be provided by an enrolling user 544 when requesting execution of the workload. Where weights are not provided by the user, one or more default weights may be utilized. The aggregated scores may then result in the total score 834. As noted above, various statistical and/or combination techniques may be utilized to generate the total score 834 beyond those specifically described in the present disclosure. All such techniques for aggregating the computed scores are considered within the scope of the present disclosure.

Figure 9:
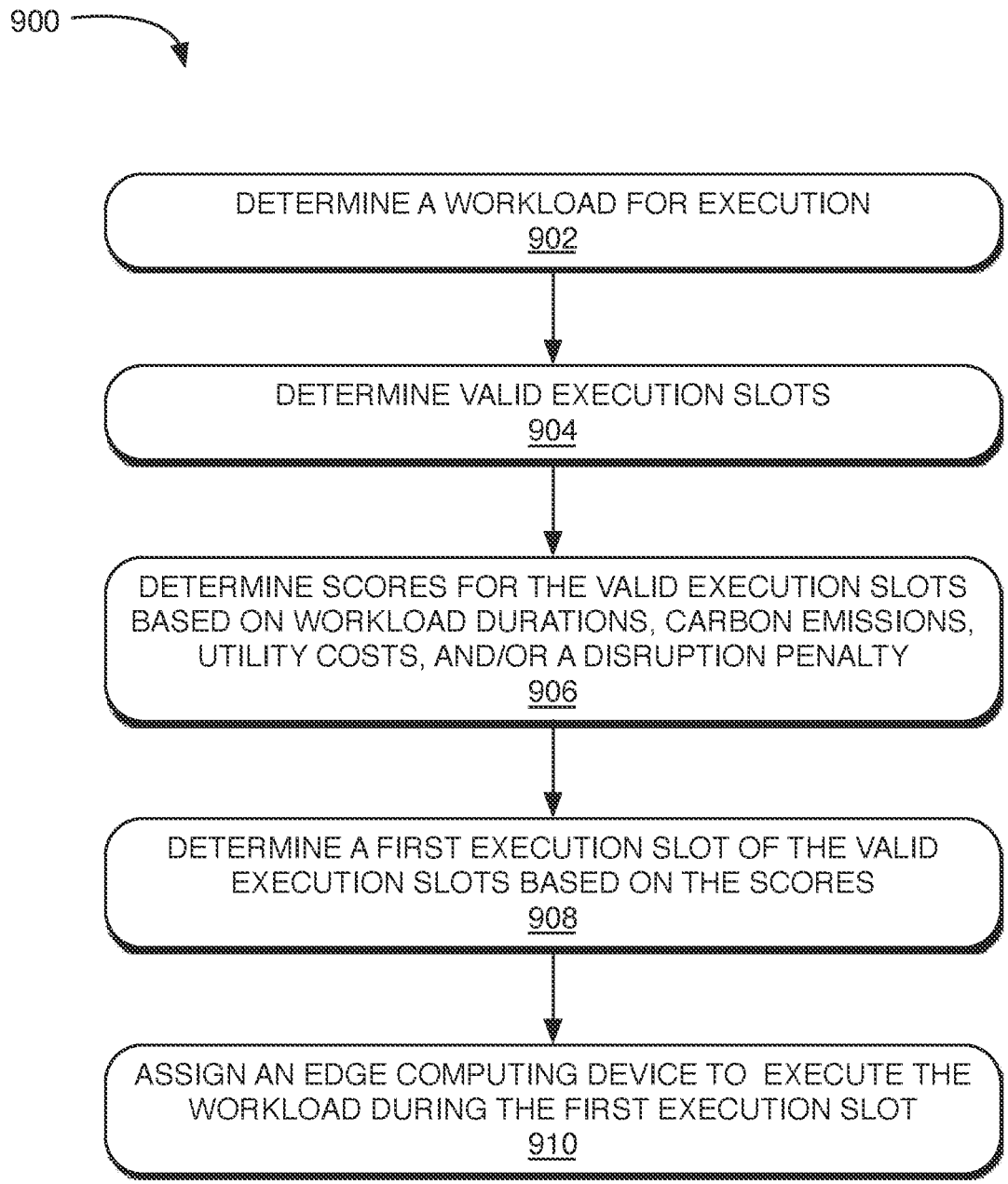
FIG. 9 is a flowchart of a method according to an exemplary embodiment of the present disclosure.

FIG. 9 is a flowchart of a method 900 according to an exemplary embodiment of the present disclosure. The method 900 may be implemented on a computer system, such as the system 500. For example, the method 900 may be implemented by the computing device 502 (e.g., by the workload optimization service 518). The method 900 may also be implemented by a set of instructions stored on a computer readable medium that, when executed by a processor, cause the computing device to perform the method 900. Although the examples below are described with reference to the flowchart illustrated in FIG. 9, many other methods of performing the acts associated with FIG. 9 may be used. For example, the order of some of the blocks may be changed, certain blocks may be combined with other blocks, one or more of the blocks may be repeated, and some of the blocks may be optional.

The method 900 includes determining a workload for execution within a distributed computing environment (block 902). For example, the computing device 502 may determine a workload 532 for execution within a distributed computing environment 546. The distributed computing environment 546 may include a plurality of computing devices 504, 506, 508, 510, including one or more edge computing devices 504, 506. Determining the workload for execution may include identifying a highest priority available workload within a work registry 522.

The method 900 includes determining valid execution slots (block 904). For example, the computing device 502 may determine valid execution slots in which one or more computing devices 504, 506, 508, 510 are available to execute workloads 524, 526, 528, 530. In certain implementations, valid execution slots may be identified as execution slots that occur before a requested execution target for the workload. In certain implementations, valid execution slots may be identified as execution slots corresponding to edge devices with sufficient computing resources available to execute the workload. For example, available computing resources for computing devices 504, 506, 508, 510 with valid execution slots may exceed a minimum computing resource threshold associated with the workload 532. In certain implementations, the computing devices 504, 506, 508, 510 may include a user computing device 504. In such instances, the valid execution slots may be identified based on downtime for the user computing device 504 (e.g., when a user typically does not actively use the user computing device 504).

The method 900 includes determining scores for the valid execution slots based on workload durations, carbon emissions, utility costs, and/or a disruption penalty (block 906). For example, the computing device 502 may determine scores 620, 708, 834 for the valid execution slots based on at least one of (i) workload durations 816 to complete the workload 532 during the valid execution slots, (ii) carbon emissions 818 to complete the workload 532 during the valid execution slots, (iii) utility costs 820 to complete the workload 532 during the valid execution slots, and (iv) a disruption penalty 822 for halting execution of the workload 532. In certain implementations, scores 620, 708, 834 may be computed for the execution slots using techniques similar to those discussed above and connection with the operations 600, 700, 800.

The method 900 includes determining a first execution slot of the valid execution slots based on the scores (block 908). For example, the computing device 502 may determine a first execution slot of the valid execution slots based on the scores 620, 708, 834 for execution of the workload 532. The first execution slot may be associated with a first computing device, such as a user computing device 504. In certain implementations, the first execution slot may be selected as the valid execution slot with the highest scores 620, 708, 834. In certain implementations, the valid execution slots may include one or more combinations of multiple execution slots (e.g., as necessary to complete execution of the workload 532). In such instances, the first execution slot to may include multiple execution slots that may correspond to multiple computing devices 504, 506, 508, 510. Additionally or alternatively, the multiple execution slots may correspond to the same computing device 504, 506, 508, 510 (e.g., at different times).

The method 900 includes assigning the first edge computing device to execute the workload during the first execution slot (block 910). For example, the computing device 502 may assign the first computing device 504 to execute the workload 532 during the first execution slot. For example, the workload optimization service 518 may maintain an assignment schedule for the computing devices 504, 506, 508, 510 within the distributed computing environment 546. In such instances, the computing device 502 may add (e.g., via the workload optimization service 518) an assignment of the first computing device 504 to execute the workload 532 during the first execution slot. In instances where the selected execution slot includes a combination of execution slots, the computing device 502 may add multiple assignments of the workload 532 to corresponding computing devices during each of the execution slots within the selected combination. The assignments may be provided to corresponding workload management agents 534, 536, 538, 540 on the assigned computing devices 504, 506, 508, 510. During the selected execution slots, the workload management agents 534, 536, 538, 540 may cause the corresponding computing devices 504, 506, 508, 510 to execute the workload 532.

Figure 10:
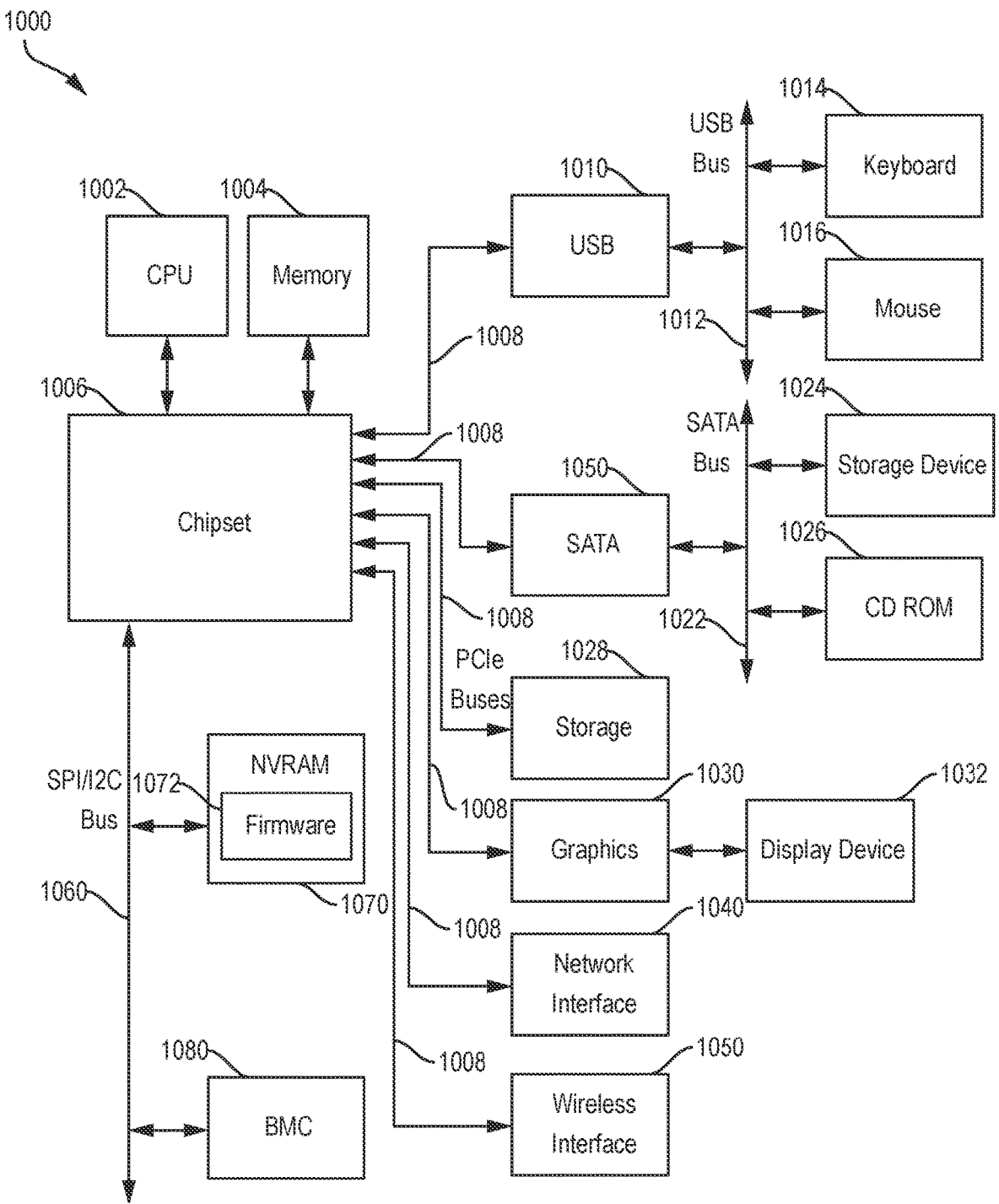
FIG. 10 is a schematic block diagram of an example information handling system according to some embodiments of the disclosure.

FIG. 10 illustrates an example information handling system 1000. Information handling system 1000 may include a processor 1002 (e.g., a central processing unit (CPU)), a memory (e.g., a dynamic random-access memory (DRAM))

1004, and a chipset 1006. In some embodiments, one or more of the processor 1002, the memory 1004, and the chipset 1006 may be included on a motherboard (also referred to as a mainboard), which is a printed circuit board (PCB) with embedded conductors organized as transmission lines between the processor 1002, the memory 1004, the chipset 1006, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 1002, the memory 1004, the chipset 1006, and/or other components may be organized as a System on Chip (SoC).

The processor 1002 may execute program code by accessing instructions loaded into memory 1004 from a storage device, executing the instructions to operate on data also loaded into memory 1004 from a storage device, and generate output data that is stored back into memory 1004 or sent to another component. The processor 1002 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 1002 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 1006 may facilitate the transfer of data between the processor 1002, the memory 1004, and other components. In some embodiments, chipset 1006 may include two or more integrated circuits (ICs), such as a northbridge controller coupled to the processor 1002, the memory 1004, and a southbridge controller, with the southbridge controller coupled to the other components such as USB 1010, SATA 1020, and PCIe buses 1008. The chipset 1006 may couple to other components through one or more PCIe buses 1008.

Some components may be coupled to one bus line of the PCIe buses 1008, whereas some components may be coupled to more than one bus line of the PCIe buses 1008. One example component is a universal serial bus (USB) controller 1010, which interfaces the chipset 1006 to a USB bus 1012. A USB bus 1012 may couple input/output components such as a keyboard 1014 and a mouse 1016, but also other components such as USB flash drives, or another information handling system. Another example component is a SATA bus controller 1020, which couples the chipset 1006 to a SATA bus 1022. The SATA bus 1022 may facilitate efficient transfer of data between the chipset 1006 and components coupled to the chipset 1006 and a storage device 1024 (e.g., a hard disk drive (HDD) or solid-state disk drive (SDD)) and/or a compact disc read-only memory (CD-ROM) 1026. The PCIe bus 1008 may also couple the chipset 1006 directly to a storage device 1028 (e.g., a solid-state disk drive (SDD)). A further example of an example component is a graphics device 1030 (e.g., a graphics processing unit (GPU)) for generating output to a display device 1032, a network interface controller (NIC) 1040, and/or a wireless interface 1050 (e.g., a wireless local area network (WLAN) or wireless wide area network (WWAN) device), such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 1006 may also be coupled to a serial peripheral interface (SPI) and/or Inter-Integrated Circuit (I2C) bus 1060, which couples the chipset 1006 to system management components. For example, a non-volatile random-access memory (NVRAM) 1070 for storing firmware 1072 may be coupled to the bus 1060. As another example, a controller, such as a baseboard management controller (BMC) 1080, may be coupled to the chipset 1006 through the bus 1060. BMC 1080 may be referred to as a service processor or embedded controller (EC). Capabilities and functions provided by BMC 1080 may vary considerably based on the type of information handling system. For example, the term baseboard management system may be used to describe an embedded processor included at a server, while an embedded controller may be found in a consumer-level device. As disclosed herein, BMC 1080 represents a processing device different from processor 1002, which provides various management functions for information handling system 1000. For example, an embedded controller may be responsible for power management, cooling management, and the like. An embedded controller included at a data storage system may be referred to as a storage enclosure processor or a chassis processor.

System 1000 may include additional processors that are configured to provide localized or specific control functions, such as a battery management controller. Bus 1060 can include one or more buses, including a Serial Peripheral Interface (SPI) bus, an Inter-Integrated Circuit (I2C) bus, a system management bus (SMBUS), a power management bus (PMBUS), or the like. BMC 1080 may be configured to provide out-of-band access to devices at information handling system 1000. Out-of-band access in the context of the bus 1060 may refer to operations performed prior to execution of firmware 1072 by processor 1002 to initialize operation of system 1000.

Firmware 1072 may include instructions executable by processor 1002 to initialize and test the hardware components of system 1000. For example, the instructions may cause the processor 1002 to execute a power-on self-test (POST). The instructions may further cause the processor 1002 to load a boot loader or an operating system (OS) from a mass storage device. Firmware 1072 additionally may provide an abstraction layer for the hardware, such as a consistent way for application programs and operating systems to interact with the keyboard, display, and other input/output devices. When power is first applied to information handling system 1000, the system may begin a sequence of initialization procedures, such as a boot procedure or a secure boot procedure. During the initialization sequence, also referred to as a boot sequence, components of system 1000 may be configured and enabled for operation and device drivers may be installed. Device drivers may provide an interface through which other components of the system 1000 can communicate with a corresponding device. The firmware 1072 may include a basic input-output system (BIOS), a unified extensible firmware interface (UEFI). Firmware 1072, and/or one or more firmware modules of the information handling system. Additionally, configuration settings for the firmware 1072 and firmware of the information handling system 1000 may be stored in the NVRAM 1070. The NVRAM 1070 may, for example, be a non-volatile firmware memory of the information handling system 1000 and may store a firmware memory map namespace of the information handling system 1000. The NVRAM 1070 may further store one or more container-specific firmware memory map namespaces for one or more containers concurrently executed by the information handling system.

Information handling system 1000 may include additional components and additional buses, not shown for clarity. For example, system 1000 may include multiple processor cores (either within processor 1002 or separately coupled to the chipset 1006 or through the PCIe buses 1008), audio devices (such as may be coupled to the chipset 1006 through one of the PCIe buses 1008), or the like. While a particular arrangement of bus technologies and interconnections is illustrated for the purpose of example, one of skill will appreciate that the techniques disclosed herein are applicable to other system architectures. System 1000 may include multiple processors and/or redundant bus controllers. In some embodiments, one or more components may be integrated together in an integrated circuit (IC), which is circuitry built on a common substrate. For example, portions of chipset 1006 can be integrated within processor 1002. Additional components of information handling system 1000 may include one or more storage devices that may store machine-executable code, one or more communications ports for communicating with external devices, and various input and output (I/O) devices, such as a keyboard, a mouse, and a video display.

In some embodiments, processor 1002 may include multiple processors, such as multiple processing cores for parallel processing by the information handling system 1000. For example, the information handling system 1000 may include a server comprising multiple processors for parallel processing. In some embodiments, the information handling system 1000 may support virtual machine (VM) operation, with multiple virtualized instances of one or more operating systems executed in parallel by the information handling system 1000. For example, resources, such as processors or processing cores of the information handling system, may be assigned to multiple containerized instances of one or more operating systems of the information handling system 1000 executed in parallel. A container may, for example, be a virtual machine executed by the information handling system 1000 for execution of an instance of an operating system by the information handling system 1000. Thus, for example, multiple users may remotely connect to the information handling system 1000, such as in a cloud computing configuration, to utilize resources of the information handling system 1000, such as memory, processors, and other hardware, firmware, and software capabilities of the information handling system 1000. Parallel execution of multiple containers by the information handling system 1000 may allow the information handling system 1000 to execute tasks for multiple users in parallel secure virtual environments.

The schematic or flow chart diagrams of FIG. 5, FIG. 8, and FIG. 9 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms, such as Adaboost or stochastic gradient boosting systems for iteratively updating weighting to train a machine learning classifier to determine a relationship between an influencing attribute, such as received device data; a system, such as an environment or particular user; and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks, and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein, may be utilized. Accordingly, the appended claims are intended to include within their scope such processes, machines, manufacture, compositions of matter, means, methods, or steps.

What is claimed is:

1. A method comprising:
   determining a workload for execution within a distributed computing environment, wherein the distributed computing environment comprises a plurality of computing devices;
   determining valid execution slots within the distributed computing environment;
   determining a first execution slot of the valid execution slots, wherein the first execution slot is associated with a first edge computing device of the plurality of computing devices; and
   assigning the first edge computing device to execute the workload during the first execution slot,
   wherein the first edge computing device is a gaming device, and wherein valid execution slots for the first edge computing device are determined as times during which the first edge computing device will not be used to execute gaming applications.

2. The method of claim 1, wherein the valid execution slots are times in which corresponding computing devices are available to execute workloads.

3. The method of claim 2, wherein valid execution slots are identified as execution slots corresponding to computing devices with sufficient computing resources available to execute the workload.

4. The method of claim 1, further comprising:
   determining scores for the valid execution slots based on at least one criteria selected from the group consisting of (i) workload durations to complete the workload during the valid execution slots, (ii) carbon emissions to complete the workload during the valid execution slots, (iii) utility costs to complete the workload during the valid execution slots, and (iv) a disruption penalty for halting execution of the workload,
   wherein the first execution slot is selected from among the valid execution slots based on the scores.

5. The method of claim 4, wherein the workload durations are computed for the valid execution slots based on at least one of a processing speed and a network speed for corresponding computing devices, and wherein the scores are further determined based on whether the workload durations exceed a target execution time for the workload.

6. The method of claim 4, wherein the carbon emissions are computed based on at least one of an estimated energy usage and projected carbon intensity for corresponding computing devices, and wherein the scores are further determined based on whether the carbon emissions exceed an emissions target for the workload.

7. The method of claim 4, wherein the utility costs are computed based on at least one of an estimated energy usage and an estimated data transfer costs for corresponding computing devices, and wherein the scores are further determined based on whether the utility costs exceed a target utility cost target for the workload.

8. The method of claim 4, wherein the disruption penalty is determined based on at least one of a slot availability confidence and projected slot migrations for the valid execution slots, and wherein the scores are further determined based on whether the disruption penalty exceeds a workload portability target.

9. The method of claim 1, wherein the first execution slot includes at least two execution slots associated with at least two edge computing devices, and wherein each of the at least two edge computing devices execute the workload.

10. The method of claim 1, wherein determining the workload comprises identifying the workload as having a highest priority of a plurality of workloads contained within a work registry.

11. An information handling system, comprising:
    a memory; and
    a processor coupled to the memory, wherein the processor is configured to perform steps comprising:
       determining a workload for execution within a distributed computing environment, wherein the distributed computing environment comprises a plurality of computing devices;
       determining valid execution slots within the distributed computing environment;
       determining a first execution slot of the valid execution slots, wherein the first execution slot is associated with a first edge computing device of the plurality of computing devices; and
       assigning the first edge computing device to execute the workload during the first execution slot,
       wherein the first edge computing device is a gaming device, and wherein valid execution slots for the first edge computing device are determined as times during which the first edge computing device will not be used to execute gaming applications.

12. The information handling system of claim 11, wherein the first execution slot is selected from among the valid execution slots based on scores determined based on workload durations computed for the valid execution slots based on at least one of a processing speed and a network speed for corresponding computing devices, and wherein the scores are further determined based on whether the workload durations exceed a target execution time for the workload.

13. The information handling system of claim 11, wherein the first execution slot is selected from among the valid execution slots based on scores determined based on carbon emissions computed based on at least one of an estimated energy usage and projected carbon intensity for corresponding computing devices, and wherein the scores are further determined based on whether the carbon emissions exceed an emissions target for the workload.

14. The information handling system of claim 11, wherein the first execution slot is selected from among the valid execution slots based on scores determined based on utility costs computed based on at least one of an estimated energy usage and an estimated data transfer costs for corresponding computing devices, and wherein the scores are further determined based on whether the utility costs exceed a target utility cost target for the workload.

15. The information handling system of claim 11, wherein the first execution slot is selected from among the valid execution slots based on scores determined based on a disruption penalty determined based on at least one of a slot availability confidence and projected slot migrations for the valid execution slots, and wherein the scores are further determined based on whether the disruption penalty exceeds a workload portability target.

16. A computer program product, comprising:
a non-transitory computer readable medium comprising code which, when executed by a processor, causes the processor to perform steps comprising:
   determining a workload for execution within a distributed computing environment, wherein the distributed computing environment comprises a plurality of computing devices;
   determining valid execution slots within the distributed computing environment;
   determining a first execution slot of the valid execution slots, wherein the first execution slot is associated with a first edge computing device of the plurality of computing devices; and
   assigning the first edge computing device to execute the workload during the first execution slot,
   wherein the first edge computing device is a gaming device, and wherein valid execution slots for the first edge computing device are determined as times during which the first edge computing device will not be used to execute gaming applications.

17. The computer program product of claim 16, wherein the first execution slot is selected from among the valid execution slots based on scores determined based on workload durations computed for the valid execution slots based on at least one of a processing speed and a network speed for corresponding computing devices, and wherein the scores are further determined based on whether the workload durations exceed a target execution time for the workload.

18. The computer program product of claim 16, wherein the first execution slot is selected from among the valid execution slots based on scores determined based on carbon emissions computed based on at least one of an estimated energy usage and projected carbon intensity for corresponding computing devices, and wherein the scores are further determined based on whether the carbon emissions exceed an emissions target for the workload.

19. The computer program product of claim 16, wherein the first execution slot is selected from among the valid execution slots based on scores determined based on utility costs computed based on at least one of an estimated energy usage and an estimated data transfer costs for corresponding computing devices, and wherein the scores are further determined based on whether the utility costs exceed a target utility cost target for the workload.

20. The computer program product of claim 16, wherein the first execution slot is selected from among the valid execution slots based on scores determined based on a disruption penalty determined based on at least one of a slot availability confidence and projected slot migrations for the valid execution slots, and wherein the scores are further determined based on whether the disruption penalty exceeds a workload portability target.

* * * * *